(12) United States Patent
Egner-Walter et al.

(10) Patent No.: US 9,573,568 B2
(45) Date of Patent: Feb. 21, 2017

(54) WIPER DEVICE FOR CLEANING VEHICLE WINDOWS

(71) Applicant: Valeo Systèmes d'Essuyage, Le Mesnil Saint Denis (FR)

(72) Inventors: Bruno Egner-Walter, Heilbronn (DE); Michael Schaeuble, Vaihingen/Enz (DE)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 422 days.

(21) Appl. No.: 14/368,732

(22) PCT Filed: Dec. 18, 2012

(86) PCT No.: PCT/EP2012/075923
§ 371 (c)(1),
(2) Date: Jun. 25, 2014

(87) PCT Pub. No.: WO2013/098120
PCT Pub. Date: Jul. 4, 2013

(65) Prior Publication Data
US 2015/0166018 A1 Jun. 18, 2015

(30) Foreign Application Priority Data

Dec. 29, 2011 (DE) .................. 10 2011 057 118

(51) Int. Cl.
*B60S 1/40* (2006.01)
*B60S 1/34* (2006.01)
*B60S 1/38* (2006.01)

(52) U.S. Cl.
CPC ........... *B60S 1/4048* (2013.01); *B60S 1/3881* (2013.01); *B60S 1/3429* (2013.01); *B60S 1/3858* (2013.01);
(Continued)

(58) Field of Classification Search
CPC .... B60S 1/3429; B60S 1/3484; B60S 1/4038; B60S 1/4045; B60S 1/4048; B60S 2001/4051; B60S 2001/4058
(Continued)

(56) References Cited

U.S. PATENT DOCUMENTS 2,974,341 A * 3/1961 Hart .......................... B60S 1/40
15/250.32
2011/0047742 A1 3/2011 Kim et al.

FOREIGN PATENT DOCUMENTS

DE 103 23 997 A1 6/2004
DE 103 20 932 A1 11/2004
(Continued)

OTHER PUBLICATIONS

International Search Report for corresponding International Application No. PCT/EP2012/075923, mailed Mar. 25, 2013 (2 pages).
(Continued)

*Primary Examiner* — Gary Graham
(74) *Attorney, Agent, or Firm* — Osha Liang LLP

(57) ABSTRACT

The invention relates to a wiper device (100) for the cleaning of vehicle windows (1), with a wiper blade (10) fastened exchangeably on a wiper arm (2), which wiper blade is connected with the wiper arm (2) via a wiper blade adapter (11), wherein in the fastening region to the wiper blade (10) the wiper arm (2) has a substantially U-shaped cross section, which embraces the wiper blade adapter (11), wherein on the wiper arm (2) in the connecting region a securing element (27) for the wiper blade adapter (11) is provided which is movably arranged at least in the longitudinal direction of the wiper arm (2) and which partially overlaps the wiper arm (2) in the connecting region and has a substantially U-shaped cross section with holding sections (46, 47) projecting inwards in the direction towards the wiper blade adapter (11). It is provided according to the invention that, in
(Continued)

Figure 7:
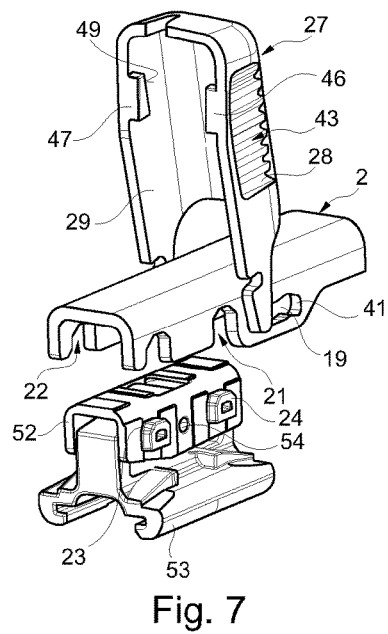

addition to its longitudinal displaceability, the securing element (27) is arranged pivotably on the wiper arm (2).

10 Claims, 3 Drawing Sheets

(52) U.S. Cl.
CPC ...... *B60S 1/4045* (2013.01); *B60S 2001/4058* (2013.01); *B60S 2001/4061* (2013.01)

(58) Field of Classification Search
USPC .................................................. 15/250.32
See application file for complete search history.

(56) References Cited

FOREIGN PATENT DOCUMENTS

| | | |
|---|---|---|
| DE | 10 2007 016 479 A1 | 10/2008 |
| DE | 10 2009 002 764 A1 | 11/2010 |
| DE | 10 2009 059 119 A1 | 6/2011 |
| FR | 2 890 925 A1 | 3/2007 |
| WO | 2012/065699 A1 | 5/2012 |
| WO | 2012/089415 A1 | 7/2012 |

OTHER PUBLICATIONS

Search Report for corresponding German Application No. DE 10 2011 057 118.3, mailed Sep. 24, 2012 (2 pages).

* cited by examiner

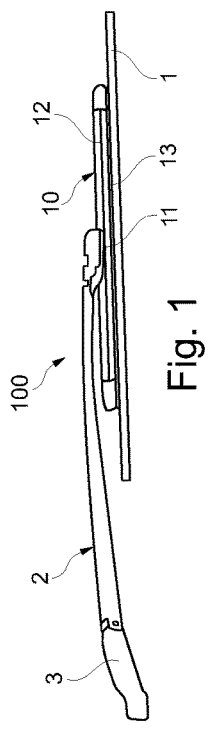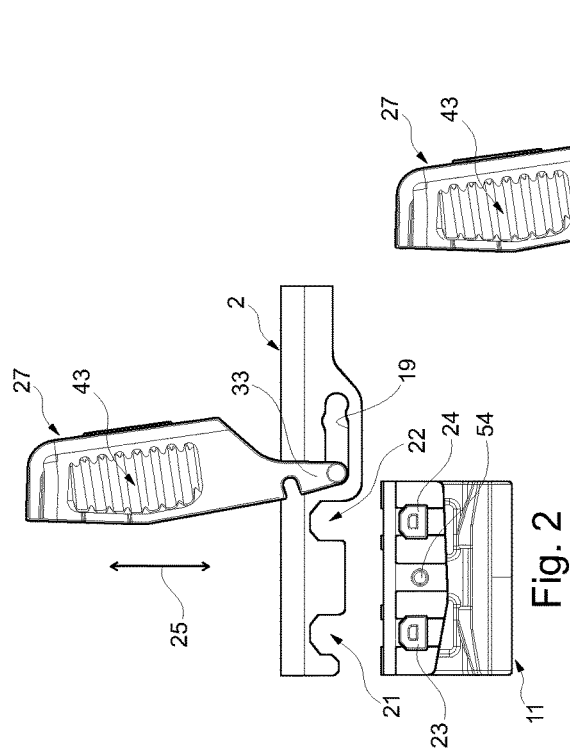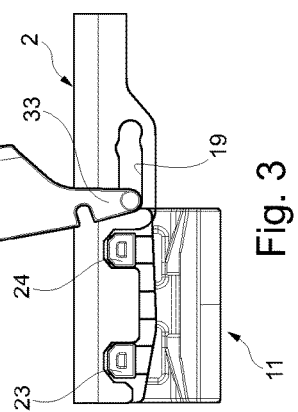

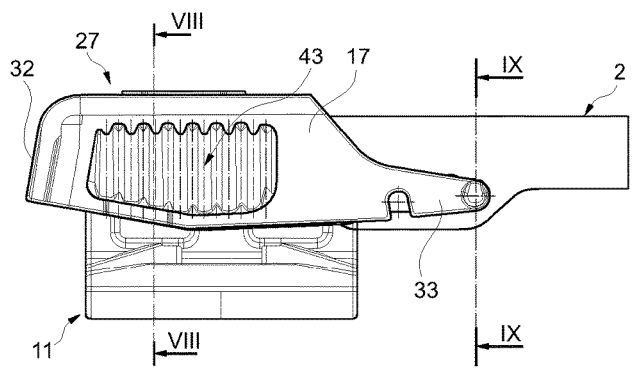
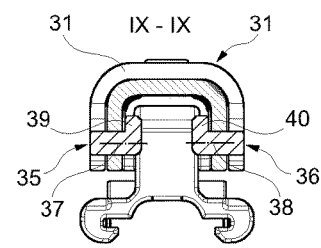
Fig. 5
Fig. 9
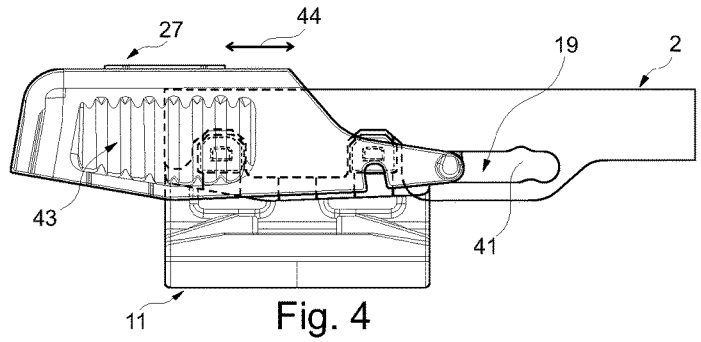
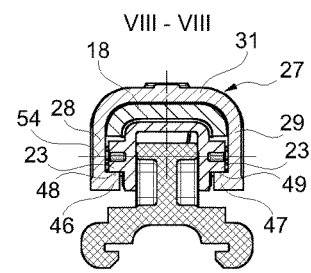
Fig. 4
Fig. 8

WIPER DEVICE FOR CLEANING VEHICLE WINDOWS

PRIOR ART

The invention relates to a wiper device for cleaning vehicle windows.

A wiper device of said type is already known from practice. In the case of the known wiper device, the connecting region of the wiper arm to a wiper blade is covered by a securing element which is arranged in a longitudinally displaceable fashion on the wiper arm. The wiper arm has recesses, for example in the form of slits, which are formed substantially perpendicularly to the wiper arm longitudinal axis and which interact with corresponding projections that are formed on a wiper blade adapter of the wiper blade. Furthermore, the wiper blade adapter has holding regions which interact with inwardly projecting holding sections formed on the securing element. When mounting a wiper blade on the wiper arm, it is firstly necessary for the securing element to be positioned in a mounting position in order that the wiper blade adapter can be inserted by way of its projections into the aforementioned recesses or slits of the wiper arm. When this has been done, the securing element can be slid in the longitudinal direction of the wiper arm into a second end position, such that the holding sections of the securing element engage over the holding regions of the wiper blade adapter and thus fix the wiper blade to the wiper arm in a plane perpendicular to the wiper blade longitudinal direction.

A disadvantage of the wiper device known from practice is that, owing to the fact that the wiper blade and the wiper arm are brought together in the region of the wiper blade adapter in the aforementioned mounting position of the securing element, an unobstructed view of the wiper arm region arranged under the securing element is prevented. As a result, it is necessary for a user to connect or join the wiper blade to the wiper adapter without having direct visual contact with the wiper arm, which is perceived by the user as cumbersome.

DISCLOSURE OF THE INVENTION

Taking the presented prior art as a starting point, the invention is based on the object of further developing a wiper device such that, for a user, the handling involved when changing a wiper blade is made easier. This is achieved, according to the invention, in the case of a wiper device for cleaning vehicle windows having the features of claim 1, in that, in addition to its longitudinal displaceability, the securing element is arranged pivotably on the wiper arm. The pivotable arrangement of the securing element on the wiper arm makes it possible, for the purpose of mounting the wiper blade on the wiper arm, for the securing element to be pivoted into a position in which the connecting region between the wiper arm and the wiper blade adapter is visible to a user from the outside. In this way, the correct positioning of the wiper blade and/or of the wiper blade adapter with respect to the wiper arm is made considerably easier.

Advantageous refinements of the wiper device according to the invention for cleaning vehicle windows are specified in the subclaims. The invention encompasses all combinations of at least two of the features disclosed in the claims, in the description and/or in the figures.

To realize the pivotability of the securing element on the wiper arm, it is provided in one embodiment of the invention, which is preferred from a design aspect, that the securing element has extensions projecting in the direction towards the wiper arm, which extensions engage into in each case one guide constructed as a longitudinal slit in the wiper arm.

In the case of the variant mentioned immediately above, it is very particularly preferably provided that, on the side facing the wiper arm, the extensions have sections, the cross sections of which are larger than the width of the longitudinal slits, and that the longitudinal slits have widenings for the introduction of the sections, the cross sections of which widenings are adapted to the cross sections of the sections. In this way, simple mounting of the securing element on the wiper arm is made possible for the manufacturer of the wiper device, and furthermore, the securing element is prevented from becoming detached from the wiper arm during normal operation, for example as a result of the exertion of external forces such as arise for example when passing through a car washing installation.

To prevent a user from inadvertently removing the securing element from the wiper arm, it is furthermore provided that the sections of the extensions can be inserted into the widenings of the wiper arm only when the securing element is in a certain angle position.

To clearly signal the different longitudinal positions of the securing element to the user, it is furthermore provided that at least one stop element is arranged on the securing element and/or on the wiper blade adapter, which stop element delimits a displacement of the securing element in the longitudinal or mounting direction. In this way, the user can haptically identify when the mounting process is complete, and when the securing element is situated in the position in which it fixes the wiper blade to the wiper arm.

To facilitate the mounting process and/or to reduce the forces when displacing the securing element, in particular if said securing element is difficult to grip for example as a result of being wet, it is proposed that the securing element has ribs on its side walls.

Figure 6:
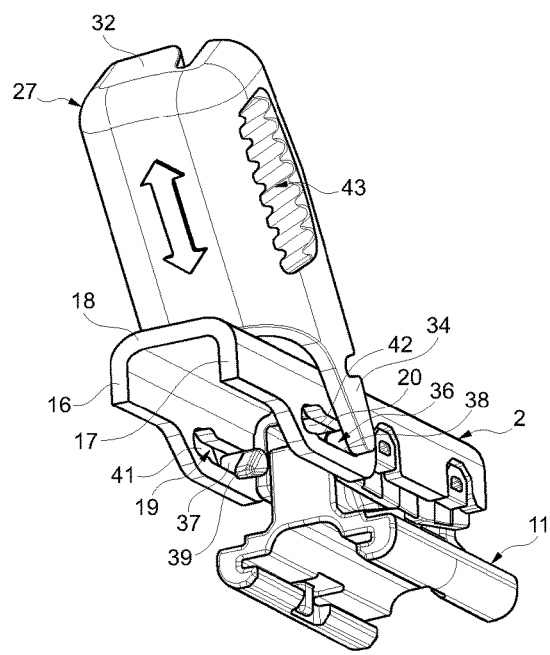

Further advantages, features and details of the invention will emerge from the following description of preferred exemplary embodiments and from the drawing, in which:

FIG. 1 is a simplified illustration of a windscreen wiper device for cleaning a vehicle window, FIG. 2 and FIG. 3 show the wiper blade adapter of a wiper blade in the connecting region to a wiper arm during the mounting of the wiper blade on the wiper arm, in each case in a side view, FIG. 4 and FIG. 5 show the locking process of a wiper blade adapter to the wiper arm in different positions of a securing element, in a side view, FIG. 6 and FIG. 7 show perspective views of the connecting region between the wiper blade adapter and the wiper arm, FIG. 8 shows a section in the plane VIII-VIII of FIG. 5, and FIG. 9 shows a section in the plane IX-IX of FIG. 5.

Identical components and components with identical function are denoted in the figures using the same reference numerals.

FIG. 1 shows a wiper device 100 according to the invention for cleaning a vehicle window 1. The wiper device 100 comprises a wiper blade 10 that is fastened exchangeably to a wiper arm 2. Here, the wiper blade 10 has a wiper blade adapter 11 which serves for the coupling of the wiper blade 10 to the wiper arm 2 and which holds an elongate wiper blade body 12. The wiper blade body 12 is arranged so as to be in abutting contact with the vehicle window 1 by way of a wiper lip 13.

The wiper blade 10 may be in the form of a so-called "aqua-blade wiper blade", that is to say the wiper blade 10 has spray openings arranged in the wiper blade body 12 for the purpose of applying a washer fluid to the vehicle window 1. Furthermore, the wiper blade 10 may also be in the form of a heatable wiper blade 10. An embodiment of the wiper blade 10 is however preferred in which said wiper blade has neither an aqua-blade function nor a heating function.

As can be seen most clearly from a juxtaposition of FIG. 2 and FIG. 6 to FIG. 8, the wiper blade adapter 11 and the wiper blade 10 are fastened to the end region, which is remote from a wiper arm joint 3, of the wiper arm 2. The wiper arm 2 is formed from sheet metal as a punched and bent part and, in the connecting region to the wiper blade 10, has a substantially U-shaped cross section with two side walls 16, 17 and an upper wall 18 and engages over the wiper blade adapter 11. It is also possible to see in each case one longitudinal slit 19, 20 formed in each side wall 16, 17 and, in each side wall 16, 17, two mounting slits 21, 22 which are spaced apart from one another axially and formed perpendicularly to the wiper blade longitudinal axis and which serve for receiving holding regions, which are in the form of extensions 23, 24, of the wiper blade adapter 11 in positively locking fashion. The fastening of the wiper blade 10 to, and release of said wiper blade from, the wiper arm 2 takes place in this case in the direction of the double arrow 25 in FIG. 2.

A securing element 27 which is preferably formed from plastic in an injection moulding process is pivotably fastened to the wiper arm 2. Here, the pivot angle in relation to the longitudinal direction of the wiper arm 2 in the connecting region to the wiper blade 10 is at least 90°, preferably approximately 180°. The securing element 27 is in the form of a covering hood with two side walls 28, 29, with an upper delimiting wall 31, and with a front wall 32 which is arranged on the face side and which acts as a stop element. On the side opposite the front wall 32, each of the two side walls 28, 29 is of elongated form with a fastening section 33, 34 which has a peg-like extension 35, 36.

The extensions 35, 36 engage into the respective longitudinal slit 19, 20 of the side wall 16, 17 of the wiper arm 2. As can also be seen on the basis of FIG. 6 and FIG. 9, each extension 35, 36 has a cylindrical section 37, 38 and a cam-like section 39, 40. It can also be seen that the slit width of the longitudinal slit 19, 20 is adapted to the diameter of the cylindrical section 37, 38. Furthermore, each of the two longitudinal slits 19, 20 has a widening 41, 42 adapted to the shape of the cam-like section 39, 40, such that the extensions 35, 36 can be inserted into the longitudinal slits 19, 20 only in the region of the widenings 41, 42, specifically only when the securing element 27 is in a certain angle position.

On each of the two side walls 28, 29 of the securing element 27 there are formed depressions which each form ribs 43 which, as a handling aid for a user, make it easier for the securing element 27 to be moved in the direction of the double arrow 44 (FIG. 4). Furthermore, on the two side walls 28, 29 of the securing element 27, on the side facing away from the upper delimiting wall 31, inwardly projecting holding sections 46, 47 which are of wedge-shaped form in a longitudinal direction are formed integrally on the securing element 27 (FIG. 7). When the wiper blade 10, and the wiper blade adapter 11, are in a fixing position on the wiper arm 2, said holding sections 46, 47 interact, by way of their top sides 48, 49, with one set of the extensions 23 on the wiper blade adapter 11, against the underside of which extensions the top sides 48, 49 of the holding sections 46, 47 can bear.

The extensions 23, 24 are arranged on a wiper-arm-side adapter element 52 which is of substantially U-shaped cross section and which engages over a wiper-blade-side adapter element 53, wherein the two adapter elements 52, 53 together form the wiper blade adapter 11 and are arranged pivotably with respect to one another about a swivel pin 54.

A wiper blade 10 is mounted on the wiper arm 2 as follows: Firstly, the securing element 27 is pivoted, corresponding to FIG. 3, into a position in which it is situated approximately perpendicular to the connecting region of the wiper arm 2. Here, the securing element 27, and the two fastening sections 33, 34 with the extensions 35, 36, are situated in the end position remote from the wiper arm joint 3. In this position, it is in particular the case that the two mounting slits 21, 22 of the wiper arm 2 in the region of the two side walls 16, 17 are clearly visible to a user, that is to say they are not hidden by the securing element 27, such that it is made possible for the user to easily connect the wiper blade 10, and the wiper blade adapter 11, to the wiper arm 2 in the direction of the double arrow 25 by virtue of the extensions 23, 24 being inserted into the longitudinal slits 19, 20. This state is illustrated in FIG. 3.

Subsequently, the securing element 27 is pivoted, corresponding to FIG. 4, through 90° into the position in which it is aligned with the wiper arm 2, and said securing element is subsequently displaced, corresponding to FIG. 5, in the direction of the wiper arm joint 3, such that said securing element is situated with the extensions 35, 36 in those end regions of the two longitudinal slits 19, 20 which face toward the wiper arm joint 3. During the displacement of the securing element 27 in the direction of the wiper arm joint 3, the holding sections 46, 47 of the securing element 27, by way of their top sides 48, 49, move into a state of operative connection with the underside of one set of the extensions 23 of the wiper blade adapter 11, and fix the wiper blade adapter 11 and the wiper blade 10 in a direction perpendicular to the wiper blade longitudinal direction and to the wiper arm 2 (FIG. 8). Furthermore, the wiper blade 10 is also positioned in the longitudinal direction with respect to the wiper arm 2 by the extensions 23, 24 arranged in the mounting slits 21, 22, such that the wiper blade 10 is, altogether, held fixed on the wiper arm 2.

For the dismounting of the wiper blade 10 from the wiper arm 2, the described mounting steps are merely performed in the reverse sequence.

The wiper device 100 thus described may be altered or modified in a variety of ways without departing from the concept of the invention. Said concept consists in the use of a securing element 27 which is pivotably arranged on the wiper arm 2 and which enables a user, when mounting a wiper blade 10 on the wiper arm 2, to clearly see the connecting region in order that said user can position the wiper blade 10 with respect to the wiper arm 2 without problems.

LIST OF REFERENCE NUMERALS

1 Vehicle window
2 Wiper arm
3 Wiper arm joint
10 Wiper blade
11 Wiper blade adapter
12 Wiper blade body
13 Wiper lip
16 Side wall
17 Side wall
18 Upper wall 19 Longitudinal slit
20 Longitudinal slit
21 Mounting slit
22 Mounting slit
23 Extension
24 Extension
25 Double arrow
27 Securing element
28 Side wall
29 Side wall
31 Delimiting wall
32 Front wall
33 Fastening section
34 Fastening section
35 Extension
36 Extension
37 Cylindrical section
38 Cylindrical section
39 Cam-shaped section
40 Cam-shaped section
41 Widening
42 Widening
43 Rib
44 Double arrow
46 Holding section
47 Holding section
48 Top side
49 Top side
52 Wiper-arm-side adapter element
53 Wiper-blade-side adapter element
54 Swivel pin
100 Window wiper device

The invention claimed is:

1. A wiper device for the cleaning of vehicle windows, comprising:
 a wiper blade fastened exchangeably on a wiper arm, wherein the wiper blade is connected with the wiper arm via a wiper blade adapter, wherein in a fastening region to the wiper blade the wiper arm has a substantially U-shaped cross section, which embraces the wiper blade adapter; and
 a securing element for the wiper blade adapter provided on the wiper arm in a connecting region, wherein the securing element is movably arranged in the longitudinal direction of the wiper arm and which at least partially overlaps the wiper arm in the connecting region and has a substantially U-shaped cross section with holding sections projecting inwards in a direction towards the wiper blade adapter, wherein the holding sections, in a mounting position in which the securing element is situated in a first position, are out of contact with holding regions constructed on the wiper blade adapter, and
 wherein, for fixing the wiper blade adapter on the wiper arm, the securing element is movable into a second position in which the holding sections of the securing element engage behind the holding regions on the wiper blade adapter, wherein in addition to its longitudinal displaceability, the securing element is arranged pivotably on the wiper arm.

2. The wiper device according to claim 1, wherein the securing element has extensions projecting in a direction towards the wiper arm, which engage into in each case one guide constructed as a longitudinal slit in the wiper arm.

3. The wiper device according to claim 2, wherein, on a side facing the wiper arm, the extensions have sections, the cross sections of which are larger than the width of the longitudinal slits, and wherein the longitudinal slits have widenings for the introduction of the sections, the cross sections of which widenings are adapted to the cross section of the sections.

4. The wiper device according to claim 3, wherein the sections can be inserted into the widenings of the wiper arm only when the securing element is in a certain angle position.

5. The wiper device according to claim 2, wherein the extensions are arranged on the securing element on a side facing a wiper arm joint.

6. The wiper device according to claim 2, wherein the securing element consists of plastic, is constructed as an injection moulded part and, on a side lying opposite the extensions, has a front transverse wall which acts as a stop.

7. The wiper device according to claim 6, wherein the securing element has ribs on its side walls.

8. The wiper device according to claim 1, wherein laterally outwardly projecting holding regions are constructed on the wiper blade adapter, which holding regions interact with recesses, preferably mounting slits, constructed on the wiper and arranged perpendicularly to the longitudinal direction of the wiper blade, and thereby fix the wiper blade to the wiper arm in the longitudinal direction.

9. The wiper device according to claim 1, wherein a pivoting angle of the securing element on the wiper arm is at least 90° in relation to longitudinal axis of the wiper arm.

10. The wiper device according to claim 1, wherein, on the securing element and/or on the wiper blade adapter, there is arranged at least one stop element which delimits a displacement of the securing element in the longitudinal direction of the wiper arm.

* * * * *